United States Patent [19]

Röhrborn

[11] 4,060,585
[45] Nov. 29, 1977

[54] PROCESS FOR PRODUCING BARIUM HYDROXIDE

[75] Inventor: Hans-Joachim Röhrborn, Moers, Germany

[73] Assignee: Metallgesellschaft Aktiengesellschaft, Frankfurt am Main, Germany

[21] Appl. No.: 659,875

[22] Filed: Feb. 20, 1976

[30] Foreign Application Priority Data

Mar. 24, 1975 Germany .............................. 2512958

[51] Int. Cl.² ............................................ C01F 11/08
[52] U.S. Cl. ................................ 423/164; 423/567 A; 423/638
[58] Field of Search ................ 423/638, 562, 514, 164, 423/561, 567, 567 A

[56] References Cited

U.S. PATENT DOCUMENTS

| | | | |
|---|---|---|---|
| 3,558,272 | 1/1971 | Northbrook | 423/562 |
| 3,652,217 | 3/1972 | Kemeny et al. | 423/638 |
| 3,669,625 | 6/1972 | Rohrborn | 423/638 |

FOREIGN PATENT DOCUMENTS

| | | | |
|---|---|---|---|
| 415,897 | 7/1923 | Germany | 423/638 |
| 519,891 | 2/1931 | Germany | 423/638 |

Primary Examiner—O. R. Vertiz
Assistant Examiner—Wayne A. Langel
Attorney, Agent, or Firm—Burgess, Dinklage & Sprung

[57] ABSTRACT

Barium hydroxide is continuously produced from barite by:
1. reducing barite with carbon at elevated temperatures and hot-leaching the reaction mixture to extract raw barium sulfide;
2. partially oxidizing the barium sulfide from step (1) by treatment with oxygen-containing gases and precipitating the resulting barium hydroxide in crystalline form and removing same;
3. oxidizing the barium polysulfide contained in the mother liquor from step (2) to difficultly soluble barium thiosulfate by treatment with oxygen-containing gases and removing same; and
4. recycling the barium thiosulfate from step (3) to reduction step (1).

4 Claims, 1 Drawing Figure

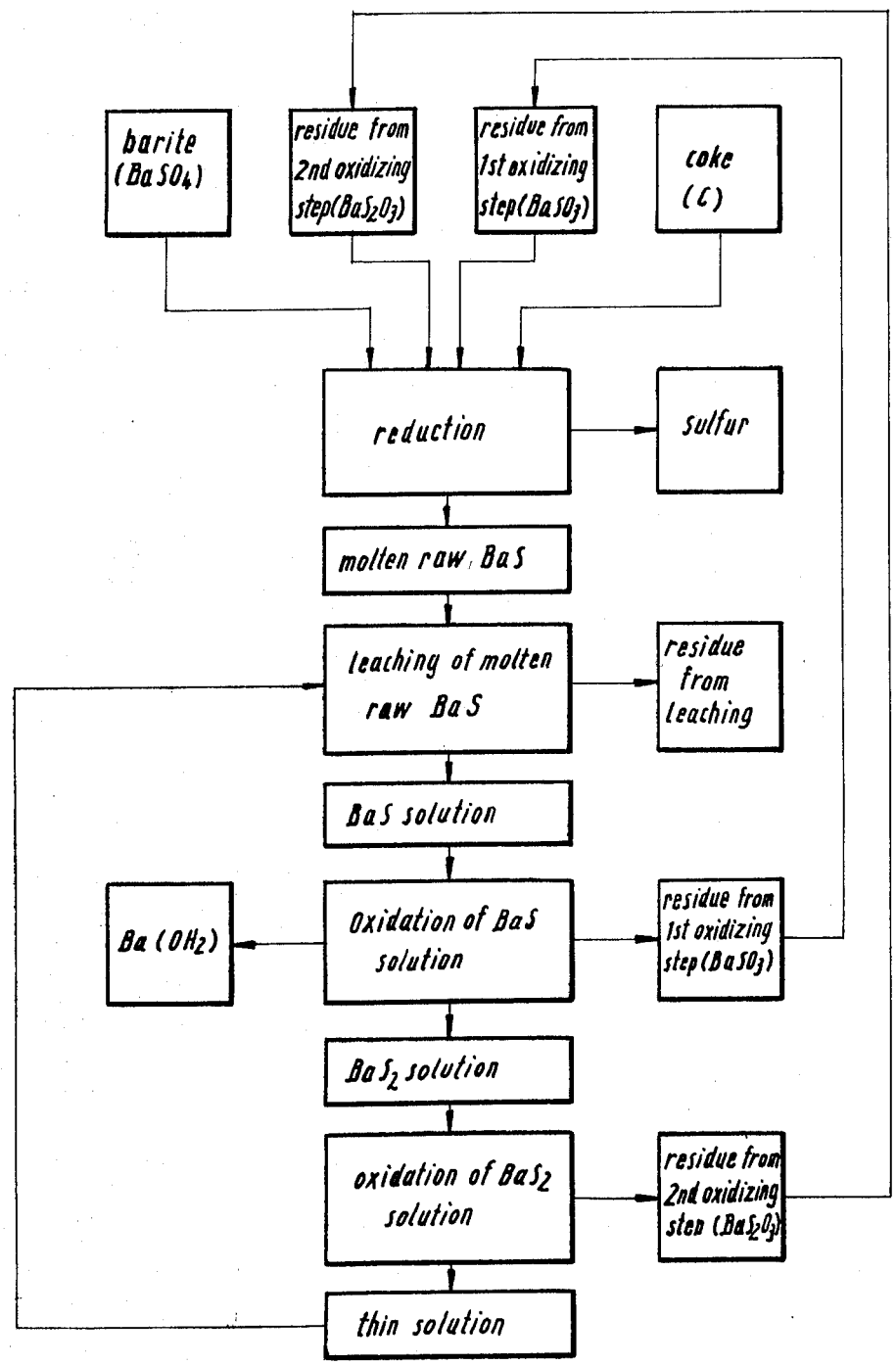

PROCESS FOR PRODUCING BARIUM HYDROXIDE

BACKGROUND

This invention relates to a process for producing barium hydroxide from barite.

Raw barium sulfide is produced in a known manner by the reduction of barium sulfate with coal. In the presence of moisture, raw barium sulfide is hydrated to form mixed crystals of barium hydroxide and barium hydrosulfide in accordance with the equation $$2\,BaS + 2\,H_2O \rightarrow Ba(OH)_2 + Ba(SH)_2.$$

In accordance with a known proposal, this mixture is separated in that hydrated barium sulfide is oxidized with air and the reaction mixture, which contains difficulty soluble barium thiosulfate and barium polysulfide, is hot-leached to extract barium hydroxide, which is then precipitated by cooling. Another use of barium thiosulfate obtained as a by-product has not been disclosed (German Pat. No. 415,897).

It is also known to recover barium hydroxide and barium polysulfides by oxidizing solutions which contain barium sulfide at temperatures above 50° C by an introducting of air, Barium hydroxide crystals are then precipitated by cooling and are removed. All or part of the mother liquor is recycled to the process. If the barium polysulfide which becomes available cannot be utilized, the process cannot be used in practice owing to the need to discard the barium polysulfide (German Pat. No. 519,981).

SUMMARY

This invention eliminates the above-mentioned and other disadvantages in the production of barium hydroxide and provides a continuous process for the production of barium hydroxide as a main product with only elementary sulfur as a by-product which can be handled and utilized easily.

This is accomplished by continuously producing barium hydroxide from barite according to the invention by a combination of the following steps:

a. barite is reduced with carbon at elevated temperature and the reaction mixture is hot-leached to extract the raw barium sulfide which has been formed;

b. the dissolved raw barium sulfide is partially oxidized by a treatment with oxygen-containing gases up to a ratio of 50 mole percent barium hydroxide to 50 mole percent barium polysulfide and the resulting barium hydroxide is precipitated in crystalline form and is removed;

c. the barium polysulfide contained in the mother liquor is oxidized to difficulty soluble barium thiosulfate by a treatment with oxygen-containing gases and is removed, and d. the removed barium thiosulfate is subsequently recycled to the reduction process.

DESCRIPTION OF THE DRAWING

The accompanying drawing is a flow diagram for carrying out the process of the invention.

DESCRIPTION

The steps of the process according to the invention can be described by the following equations:

$$BaSO_4 + 2C \rightarrow BaS + 2CO_2 \quad (1)$$

$$2\,BaS_{aq} + \tfrac{1}{2}\,O_2 + H_2O \rightarrow Ba(OH)_2 + BaS_2 \quad (2)$$

$$BaS_2 + 3/2\,O_2 \rightarrow BaS_2O_3 \quad (3)$$

$$BaS_2O_3 + 3/2\,C \rightarrow BaS + S + 3/2\,CO_2 \quad (4)$$

Formally, the above equations describing the individual steps result in the sum equation:

$$BaSO_4 + 7/2\,C + 2O_2 + H_2O \rightarrow Ba(OH)_2 + S + 7/2\,CO_2.$$

It is apparent from this sum equation that in addition to barium hydroxide, the main product, only sulfur becomes available as a by-product which is to be utilized.

Equipment known per se may be used to carry out the process according to the invention as per the flow diagram show in the drawing. The starting material (barite) is reduced at a temperature of 800°–1300° C and preferably at 1000°–1200° C; this may be effected, e.g., in a fluidized-bed furnace or in a rotary kiln. In the last-mentioned equipment the reduction (equation 1) is effected by feeding a mixture of barite, barium thiosulfate (from equation 3) and finely divided coal in suitable proportions to a rotary kiln. This reduction process is carried out according to equations 1 and 4 and results in the formation of barium sulfide, carbon dioxide, and sulfur. At the temperature employed, sulfur is vaporous and escapes with the exhaust gas, which is cooled to condense the sulfur. For instance, sulfur may be separated as solid in plant used for an electrostatic purification of gas. The reaction product of the reduction process contains mainly barium sulfide and is leached with hot water so that barium sulfide is virtually completely dissolved. Any insoluble residue which may be due to the gangue of the barite are removed and discarded. The barium sulfide solution is then partially oxidized by a treatment with oxygen-containing gases, preferably at temperatures of 60°–80° C and in equipment which can either suck by itself the oxidizing gases during the stirring process or can be fed with said gases in a finely divided form and at a metered rate. Such equipment includes, e.g., flotation cells and aerating cells, such as are used for the biological purification of sewage, also aerating stirrers and mixing sirens for a supply of gas. The oxidation is suitably effected in a plurality of units of the kind mentioned above, which are connected in series, so that the total residence time of the barium sulfide amounts to 1–2 hours, depending on the concentration of the starting solution. In the equipment of the kind defined, the barium sulfide solution is treated with an excess of the oxidizing gas stream. The surplus oxygen required depends to a high degree on the structural details of the equipment employed and on the efficiency thereof. These conditions, e.g., the distribution of the oxygen-containing gas stream in the liquid, can easily be determined by individual tests.

As a general rule, oxygen should be supplied in 1 1/2 to 2 times the quantity which is stoichiometrically required. As soon as the oxidation of the barium oxide in the reaction solution has proceeded to such an extent that barium hydroxide and barium polysulfide are present in equimolar proportions, the solution is cooled and the crystalline barium hydroxide is removed. The barium polysulfide solution left after the separation of the barium hydroxide is subsequently reheated to temperatures of about 20°–95° C, preferably about 60° C, and is oxidized with oxygen-containing gases to form barium thiosulfate. This is precipitated in a difficultly soluble form and is removed by suitable methods known per se, such as decanting or filtration. The residue is dried and is recycled to the reduction process in a mixture with barite and coal. The filtrate is also returned to the cycle and is used to leach the barium sulfide.

The oxidation of the barium polysulfide to barium thiosulfate may be effected continously in equipment of the type used to oxidize the barium sulfide, such as self-sucking or forcibly aerated flotation stirrers. Where flotation stirrers are used, the solids formed during the oxidation can be separated in a particularly desirable manner as over-flowing foam from the clear solution. This practice results in a preliminary thickening of the solid so that the subsequent filtration is facilitated and the volume of liquid to be filtered is reduced.

The advantages of the process according to the invention reside in that a very pure barium hydroxide, which is free from sulfur compounds, is produced by a continuous process from barite, and that a by-product is recovered in the form of elementary sulfur, which can be utilized well.

The invention will be explained more fully with reference to the following examples.

EXAMPLES

Reduction of Barite and Leaching 148.5 g barite, which contains 95% $BaSO_4$ (141.1 g $BaSO_4$) are mixed with 31.4 g oxidation residue (calculated as $BaSO_3$) from the first step (step 2 of equations 1-4), 119.3 g oxidation residue ($BaS_2O_3$) from the second step (step 3 of equations 1-4) and 38.3 grams coke.

In a laboratory rotary kiln, this mixture is discontinuously heated at 1000° C for 2 hours without an influence on the gas atmosphere in the kiln. This treatment results in a reduction of 90% with evaporation of 13.8 g sulfur. 232.2 g molten raw BaS are recovered, which contains 80.6% or 187.1 g BaS.

The molten raw material which contains 187.1 g BaS is leached for 1 h at 80° C and with stirring in 1 liter of a mother liquor which contains 4.0 dissolved BaS and has been obtained by the oxidation of the $BaS_x$ solution. The residual constituents which have not been reduced are filtered off, washed with 50 ml hot water, and discarded.

Oxidation of BaS and Recovery of $Ba(OH)_2$

The BaS solution which has been recovered (1 liter, containing 191.1 g BaS), is aerated with air in an oxidizing cell for two hours at 60°–80° C. The $BaCO_3$, $BaSO_3$, $BaSO_4$ formed by the oxidation are then filtered off and are recycled to the reduction process. 31.4 g of these substances, calculated as $BaSO_3$, become available in this step.

The filtered solution is cooled to 15° C to crystallize the $Ba(OH)_2$, which is removed by centrifugation and is washed with about 100 ml ice water. The weighed product amounts to $$152.0 \text{ g } Ba(OH)_2 \cdot 8H_2O = 91.1 \text{ g } Ba(OH)_2 \cdot H_2O.$$

The mother liquor (1 liter) is combined with the washing water and contains 85.0 g BaS as $BaS_x$.

Oxidation of $BaS_x$ Recovery of $BaS_2O_3$

The $BaS_x$ solution (1 liter of mother liquor) left after crystallization of $Ba(OH)_2$ is also oxidized in an oxidizing cell at about 60° C for 2½ hours. 1.6 liters air are used in this step per liter of solution. 119.3 g $BaS_2O_3$ can be recovered from 85.0 g BaS as $BaS_x$. 4.0 grams BaS as $BaS_2O_3$ remain in the filtrate, which is recycled for use in the leaching of the molten raw BaS.

What is claimed is:

1. Process for continuously producing barium hydroxide from barite wherein sulfur is essentially the only bi-product, comprising the steps of:
   a. reducing barite with carbon at temperatures of 800° to 1300° C and hot-leaching the reaction mixture of molten raw barium sulfide;
   b. partially oxidizing the leaching product from the raw barium sulfide by treatment with oxygen-containing gases until a ratio of 50 mol percent barium hydroxide to 50 mol percent barium polysulfide is reached and precipitating the resulting barium hydroxide in crystalline form by cooling and removing same;
   c. oxidizing the barium polysulfide contained in the mother liquor from (b) to difficulty soluble barium thiosulfate by treatment with oxygen-containing gases and removing the precipitated barium thiosulfate; and
   d. recycling the precipitated barium thiosulfate from (c) to reduction step (a).

2. Process of claim 1 wherein reduction step (a) is carried out at temperatures of 1000°–1200° C.

3. Process of claim 1 wherein oxygen treatment step (b) is carried out at temperatures of 20°–95° C.

4. Process of claim 1 wherein oxygen treatment step (b) is carried out at temperatures of 60°–80° C.

* * * * *

UNITED STATES PATENT AND TRADEMARK OFFICE
CERTIFICATE OF CORRECTION

PATENT NO. : 4,060,585
DATED : November 29, 1977
INVENTOR(S) : Hans-Joachim Röhrborn It is certified that error appears in the above-identified patent and that said Letters Patent are hereby corrected as shown below:

Column 1, line 18, "difficulty" should be

--difficultly--.

Column 2, line 61, "barium oxide" should be

Signed and Sealed this

Fourth Day of April 1978

[SEAL]

Attest:

RUTH C. MASON
Attesting Officer

LUTRELLE F. PARKER
Acting Commissioner of Patents and Trademarks